(12) United States Patent
Peeler et al.

(10) Patent No.: US 7,087,306 B2
(45) Date of Patent: Aug. 8, 2006

(54) COMPOSITE ARTICLE

(75) Inventors: Calvin T. Peeler, Canton, MI (US); Michael C. May, Clawson, MI (US); Theresa A. Howard, Canton, MI (US)

(73) Assignee: BASF Corporation, Florham Park, NJ (US)

( * ) Notice: Subject to any disclaimer, the term of this patent is extended or adjusted under 35 U.S.C. 154(b) by 496 days.

(21) Appl. No.: 10/116,972

(22) Filed: Apr. 5, 2002

(65) Prior Publication Data

US 2003/0190481 A1 Oct. 9, 2003

(51) Int. Cl.
*B32B 27/40* (2006.01)

(52) U.S. Cl. ............... 428/424.4; 428/424.2; 428/187

(58) Field of Classification Search ............ 428/424.4, 428/424.2, 187
See application file for complete search history.

(56) References Cited

U.S. PATENT DOCUMENTS

| | | | | |
|---|---|---|---|---|
| 3,879,248 A | * | 4/1975 | Kest ............................ | 156/289 |
| 4,389,454 A | | 6/1983 | Horacek et al. | |
| 5,116,557 A | | 5/1992 | Debaes et al. | |
| 5,118,728 A | | 6/1992 | Primeaux | |
| 5,171,818 A | | 12/1992 | Wilson | |
| 5,215,796 A | | 6/1993 | Mueller et al. | |
| 5,232,996 A | * | 8/1993 | Shah et al. ................. | 525/452 |
| 5,543,225 A | | 8/1996 | Mueller et al. | |
| 5,595,701 A | | 1/1997 | MacGregor et al. | |
| 5,639,546 A | * | 6/1997 | Bilkadi ........................ | 428/331 |
| 5,985,986 A | | 11/1999 | Kubitza et al. | |
| 6,026,760 A | | 2/2000 | Phillips et al. | |
| 6,092,343 A | | 7/2000 | West et al. | |
| 6,130,270 A | * | 10/2000 | Ukon et al. .................. | 522/182 |

OTHER PUBLICATIONS

Gregory, Peter, "Dyes and Dye Intermediates", Kirk–Othmer Encyclopedia of Chemical Technology, John Wiley & Sons: 1993; online posting date Dec. 4, 2000.*

* cited by examiner

*Primary Examiner*—Melanie Bissett
(74) *Attorney, Agent, or Firm*—Fernando A. Borrego; Howard & Howard

(57) ABSTRACT

A composite article includes an acrylic layer, a UV-cured layer formed from a UV-curable composition, and a polyurethane backing layer. A method of forming the composite article includes applying the UV-curable composition to the acrylic layer such that the composition is between the acrylic layer and the polyurethane backing layer to enhance bonding between these layers. The UV-curable composition includes at least one monomer which is an ethylenically unsaturated methacrylate monomer, an ethylenically unsaturated acrylate monomer, or both. The at least one monomer has a hydroxy functional group. The monomer is compatible with the acrylic layer and the hydroxy functional group of the monomer is reactive with a polyisocyanate from the polyurethane backing layer. The UV-curable composition also includes a curing initiator that is reactive with the monomer. Upon exposure of the UV-curable composition to UV electromagnetic radiation, the curing initiator enables the composition to cure to the acrylic layer.

47 Claims, No Drawings

COMPOSITE ARTICLE

FIELD OF THE INVENTION

The subject invention generally relates to a composite article including an acrylic layer, a polyurethane layer and a UV-cured layer formed from a UV-curable composition, and a method of forming the composite article using the UV-curable composition. The composite article and the method used in forming the composite article may be utilized in the boating, automobile, swimming pool, and bathtub industries. The subject invention more specifically relates to a UV-curable composition that is applied between an acrylic layer and a polyurethane layer in a composite article to enhance bonding between these layers.

BACKGROUND OF THE INVENTION

Use of composite articles throughout the boating, automobile, swimming pool, and bathtub industries is known in the art. Prior art composite articles include those comprising a first layer of styrenated polyester and a second layer of polyurethane. As understood by those skilled in the art, the first layer is a top layer, or show surface, of the composite article, and the second layer is a backing layer of the composite article that functions to provide support and durability to the completed composite article.

It is known in the art that during application of the first layer of styrenated polyester to a mold substrate large quantities of styrene monomers, which are considered volatile organic compounds (VOCs), are emitted and this is undesirable for environmental, health, and safety reasons. Large quantities of other VOCs, such as methyl ethyl ketone, are also typically emitted during application and cross-linking of the styrenated polyester first layers of the prior art. Emission of these other VOCs is also undesirable for environmental, health, and safety reasons. Additionally, the cross-linking of the styrenated polyester first layers typically requires extended cures including exposure to increased temperatures. It is understood in the art that such cures are costly and time consuming.

Furthermore, because the first layer of the composite article is the show surface of the composite article, the composite articles of the prior art that include styrenated polyester as the first layer are excessively brittle and suffer from cracking and chipping defects due to this excessive brittleness characteristic of styrenated polyesters. Such defects become particularly apparent during shipping, handling, transportation, and use of the composite articles.

Finally, the composite articles having styrenated polyester-based show surfaces, as well as other composite articles of the prior art, are deficient because their show surface is unstable under prolonged exposure to ultraviolet light.

Due to the many difficulties associated with the styrenated polyesters as set forth above, it is desirable to form composite articles having top layers or show surfaces formed of acrylic instead of styrenated polyester. The composite articles of the prior art having acrylic show surfaces, however, have not been able to form a suitable cohesive bond between the polyurethane backing layer and the acrylic show surface. Consequently, these composite articles have extremely poor inter-layer adhesion between the polyurethane backing layer and the acrylic show surface resulting in delamination and susceptibility to chip and other defects of the composite article.

In view of the deficiencies identified in the composite articles of the prior art, it has been desirable to provide a novel and unique UV-curable composition, composite article including the UV-curable composition, and method of forming the composite article using the UV-curable composition. Specifically, it is desirable to provide a UV-curable composition that can be applied between acrylic and polyurethane layers of a composite article to enhance bonding between these layers and to optimize certain physical properties of the composite article.

SUMMARY OF THE INVENTION

A composite article including a UV-cured layer formed from a UV-curable composition, and a method of forming the composite article using the UV-curable composition are disclosed. The composite article includes an acrylic layer, a polyurethane layer, and the UV-cured layer formed from the UV-curable composition. The UV-curable composition is applied between the acrylic layer and the polyurethane layer to enhance bonding between the acrylic layer and the polyurethane layer. The UV-curable composition is applied to the acrylic layer. The polyurethane layer is the reaction product of a polyol resin and a stoichiometric excess of polyisocyanate.

More specifically, the UV-curable composition includes at least one monomer including an ethylenically unsaturated methacrylate monomer, an ethylenically unsaturated acrylate monomer, or combinations thereof. The monomer is compatible with the acrylic layer. Furthermore, the monomer includes a hydroxy functional group which is reactive with the polyisocyanate from the polyurethane layer. The UV-curable composition further includes a curing initiator reactive with the monomer. Upon exposure of the UV-curable composition to UV electromagnetic radiation, the curing initiator reacts with the monomer thereby enabling the UV-curable composition to cure to the acrylic layer.

Accordingly, the subject invention offers a novel and unique UV-curable composition, composite article including the UV-cured layer formed from the UV-curable composition, and method of forming the composite article using the UV-curable composition. More specifically, the composite article of the subject invention, in addition to the UV-cured layer, includes an acrylic layer and a polyurethane layer. The UV-curable composition is applied between the acrylic layer and the polyurethane layer to enhance bonding such that the physical properties of the composite article, such as bond strength, are optimized.

DETAILED DESCRIPTION OF THE INVENTION

A UV-curable composition is disclosed. A composite article, including a UV-cured film layer formed from the UV-curable composition, and a method of forming the composite article using the UV-curable composition are also disclosed. The composite article includes an acrylic layer, a UV-cured layer, and a polyurethane layer.

The UV-curable composition and the polyurethane layer are applied to the acrylic layer to form the composite article. As described in greater detail below, the acrylic layer is provided by vacuum forming an acrylic-based coating composition. After the acrylic layer has been vacuum formed and mounted on a separate form, primarily for support, the UV-curable composition is applied to the acrylic layer mounted on the form. The UV-curable composition is then cured. After the UV-curable composition has been cured thereby forming the UV-cured layer, the polyurethane layer is applied, preferably spray applied, to the UV-cured layer and allowed to cure. The acrylic layer, the UV-cured layer, and the polyurethane layer, forming the composite article, are then de-molded. The acrylic layer is a top layer or show surface of the completed composite article, and the polyurethane layer is a backing layer that functions to provide support and durability to the completed composite article. As a result, the polyurethane layer of the subject invention is hereinafter described as the polyurethane backing layer. Preferably, the acrylic layer is an acrylic-based substrate used in the boating, automobile, swimming pool, and bathtub industries. Most preferably, the acrylic-based substrate is a show surface of a bathtub.

The polyurethane backing layer, formed of a polyurethane-based coating, is the reaction product of a polyol resin and a stoichiometric excess of polyisocyanate. The polyol resin includes, among other components, at least one polyol. Preferably, the polyol resin includes a plurality of polyols. Although polyether polyols are preferred, the at least one polyol may also include polyester polyols.

Suitable polyols in the polyol resin include, but are not limited to, phthalic anhydride-initiated polyester polyols, aromatic amine-initiated polyols, aliphatic amine-initiated polyols, polyoxyalkylene polyether polyols, polycaprolactone polyols, polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, graft dispersion polyols, and combinations thereof.

Included among the polyoxyalkylene polyether polyols are polyoxyethylene polyols, polyoxypropylene polyols, polyoxybutylene polyols, polytetramethylene polyols, and heteric and block copolymers. The block copolymers may include, for example combinations of polyoxypropylene and polyoxyethylene, poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859, *Encyclopedia of Chemical Technology*, Vol. 7, pp. 257–262, published by Interscience Publishers, Inc. (1951) or in U.S. Pat. No. 1,922,459. The alkylene oxides may be added to the initiator compound individually, sequentially one after the other to form blocks, or in mixtures to form a heteric polyether. The polyoxyalkylene polyether polyols may have either primary or secondary hydroxyl groups.

The polyoxyalkylene polyether polyols may be aromatic amine-initiated or aliphatic amine-initiated polyoxyalkylene polyether polyols. The amine-initiated polyols may be polyether polyols terminated with a secondary hydroxyl group through addition of, for example, propylene oxide as the terminal block. It is preferred that the amine-initiated polyols contain 50 weight percent or more, and up to 100 weight percent, of secondary hydroxyl group forming alkylene oxides, such as polyoxypropylene groups, based on the weight of all oxyalkylene groups. This amount can be achieved by adding 50 weight percent or more of the secondary hydroxyl group forming alkylene oxides to the initiator molecule in the course of manufacturing the polyol.

As described above, suitable initiator compounds for the polyol include primary or secondary amines. These would include, for the aromatic amine-initiated polyether polyol, the aromatic amines such as aniline, N-alkylphenylenediamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes, with preference given to vicinal toluenediamines.

For the aliphatic amine-initiated polyol, any aliphatic amine, whether branched or unbranched, substituted or unsubstituted, saturated or unsaturated, may be used. These would include, as examples, mono-, di-, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

The polyoxyalkylene polyether polyols may generally be prepared by polymerizing alkylene oxides with polyhydric amines. Any suitable alkylene oxide may be used such as ethylene oxide, propylene oxide, butylene oxide, and combinations of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

Also suitable are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and in the Examples of U.S. Pat. No. 3,823,201; in columns 2–8 and in the Examples of U.S. Pat. No. 4,690,956; and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 µm, preferably less than 10 µm.

In a preferred embodiment of the subject invention, the polyol resin of the polyurethane backing layer includes a first and a second polyol. Preferably, the first polyol, a polyether polyol, is present in an amount of from 35 to 55, more preferably from 40 to 50, parts by weight of the polyol resin. The first polyol is preferably a trimethylolpropane-initiated polyether polyol having a hydroxyl number of from 25 to 45 meq polyol/g KOH and an average functionality of from 2 to 3. More preferably, the hydroxyl number of the first polyol is from 30 to 40 meq polyol/g KOH and the average functionality of the first polyol is from 2.4 to 2.8. A suitable first polyol is commercially available as Pluracol® 538 from BASF Corporation.

The second polyol, also a polyether polyol, is preferably present in an amount of from 10 to 30, more preferably from 15 to 25, parts by weight of the polyol resin. The second polyol is preferably a vicinal toluenediamine-initiated polyether polyol having a hydroxyl number of from 300 to 500 meq polyol/g KOH and an average functionality of from 3 to 5. More preferably, the hydroxyl number of the second polyol is from 350 to 450 meq polyol/g KOH and the average functionality of the second polyol is from 3.5 to 4.5. A suitable second polyol is commercially available as Pluracol® 736 from BASF Corporation.

In addition to the at least one polyol, the polyol resin may further include a supplemental chain extender. The chain extender is preferably a diol or a mixture of diols. Such diols preferably include any aliphatic, cycloaliphatic, and/or araliphatic diol having from 2 to 14 carbon atoms, more preferably from 4 to 10 carbon atoms. The supplemental chain extender helps achieve desired physical properties of the polyurethane backing layer and therefore in the overall composite article.

Preferably, the diol selected is diethylene glycol (DEG). Alternative chain extenders include, but are not limited to, ethylene glycol, propylene glycol, 1,4-butanediol, 1,5-pentane diol, 1,6-hexanediol, 1,3-propanediol, 1,10-decanediol, o-, m-, and p-dihydroxycyclohexane, diethylene glycol, dipropylene glycol, primary and secondary aromatic diamines, 3,3'-di- and/or 3,3'-, 5,5'-tetraalkyl-substituted diaminodiphenyl-methanes, and bis(2-hydroxyethyl) hydroquinone. The chain extender typically has a number average molecular weight of less than 400, preferably from 60 to 300 and is present in an amount of from 10 to 30, more preferably from 14 to 20, parts by weight based on 100 parts by weight of the polyol resin. Triols such as 1,2,4- and 1,3,5-trihydroxycyclohexane, glycerol, and trimethylolpropane, and combinations thereof can also be used as chain extenders. The polyurethane backing layer can also be prepared by using mixtures of diols and triols as the chain extenders.

The polyol resin may also include one or more additives directed at enhancing the performance of one or more physical properties of the composite and/or the polyurethane backing layer. For instance, the additive or additives may be selected from the group consisting of surfactants, cell regulator, flame retardants, fillers, dyes, water scavengers, anti-foam agents, catalysts, UV performance enhancers, pigments, hindered amine light stabilizers, and combinations thereof. Other suitable additives include, but are not limited to, cell regulators, hydrolysis-protection agents, fungistatic and bacteriostatic substances, dispersing agents, adhesion promoters, and appearance enhancing agents. Although the subject invention is not intended to be limited to these examples, some specific examples of these additives include aluminum tri-hydrate, calcium carbonate, gypsum, wollastonite, phosphorus, silica, glass including glass beads, calcium sulfate, and magnesium hydroxide.

A catalyst may be employed as an additive to greatly accelerate the reaction between the polyol resin and the polyisocyanate of the polyurethane backing layer. Examples of suitable catalysts are organometallic catalysts, preferably organotin catalysts, although it is possible to employ metals such as aluminum, zirconium, lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_1-C_{18}$ methylene group optionally substituted or branched with a $C_{1-C4}$ alkyl group, Y is hydrogen or a hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group.

Specific examples of suitable catalysts are tin (II) acetate, tin (II) octanoate, tin (II) ethylhexanoate and tin (II) laurate; and dialkyl (from 1 to 8 carbon atoms) tin (IV) salts of organic carboxylic acids having 1–32 carbon atoms, preferably 1–20 carbon atoms, e.g., diethyltin diacetate, dibutyltin diacetate, dibutyltin dioctoate, dibutyltin dilaurate, dibutyltin maleate, dihexyltin diacetate, and dioctyltin diacetate. Other suitable organotin catalysts are organotin alkoxides and mono or polyalkyl (from 1 to 8 carbon atoms) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (from 1 to 20 carbon atoms) tin dimercaptides, including dimethyl-, dibutyl-, and dioctyl-tin dimercaptides.

As for catalysis of the reaction between the polyol resin and the polyisocyanate, in addition to the catalysts already identified above, tertiary amines may also be used to promote urethane linkage formation in the polyurethane backing layer. These amines include triethylamine, 3-methoxypropyldimethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl4-dimethylaminoethyl-piperazine, 1,2-dimethylimidazole, 1-azabicylo[3.3.0]octane and preferably 1,4-diazabicylol[2.2.2]octane, and alkanolamine compounds, such as triethanolamine, triisopropanolamine, N-methyl- and N-ethyldiethanolamine and dimethylethanolamine.

A surfactant and/or cell regulator may also be incorporated into the polyurethane backing layer. Specific examples of surfactants are salts of sulfonic acids, e.g., alkali metal salts or ammonium salts of dodecylbenzene- or dinaphthyl-methanedisulfonic acid and ricinoleic acid. Other preferred surfactants include silicone-containing surfactant polymers. Specific examples of anti-foam agents include siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil. Specific examples of cell regulators include paraffins, fatty alcohols, and dimethylpolysiloxanes.

For the purposes of the subject invention, fillers include conventional organic and inorganic fillers and reinforcing agents. More specific examples include inorganic fillers, such as silicate minerals, for example, phyllosilicates such as antigorite, serpentine, hornblends, amphiboles, chrysotile, and talc; metal oxides, such as aluminum oxides, titanium oxides and iron oxides; metal salts, such as chalk, barite and inorganic pigments, such as cadmium sulfide, zinc sulfide and glass, among others; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

Examples of suitable flame retardants are tricresyl phosphate, tris(2-chloroethyl) phosphate, tris(2- chloropropyl) phosphate, and tris(2,3-dibromopropyl) phosphate. A suitable flame retardant in compositions of the present invention comprises FYROL® PCF, which is a tris(chloro propyl)phosphate commercially available from Albright & Wilson.

In addition to the above-mentioned halogen-substituted phosphates, it is also possible to use inorganic or organic flame retardants, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or combinations of two or more flame retardants, e.g., ammonium polyphosphates and melamine, and, if desired, corn starch, or ammonium polyphosphate, melamine, and expandable graphite and/or, if desired, aromatic polyesters, in order to flameproof the polyurethane backing layer.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

The polyisocyanate reacts with the polyol resin, specifically with the polyol and the other components of the polyol resin, to form the polyurethane backing layer having urethane linkages. The polyisocyanate may also be a pre-polymer. That is, the polyisocyanate may be a polyisocyanate initiated pre-polymer including the polyisocyanate in a stoichiometric excess amount and a polyol resin component. This polyol resin component of the pre-polymer may be the same as the polyol resin described above. In any event, the polyisocyanates utilized in the subject invention preferably have an average functionality of greater than 2, most preferably 2.5 or more. This functionality provides for a greater crosslinking density which improves the overall dimensional stability of the composite article.

In a preferred embodiment of the subject invention, the polyisocyanate is a polymeric diphenylmethane diisocyanate (PMDI) having an average functionality of about 2.7. A suitable polyisocyanate is commercially available as ELASTOFLEX® R23000 from BASF Corporation, Wyandotte, Mich. If the polyisocyanate is a polyisocyanate initiated pre-polymer, then it is preferably a PMDI initiated pre-polymer including the PMDI in a stoichiometric excess amount and the polyol resin component of the pre-polymer.

Other suitable organic polyisocyanates, defined as having 2 or more isocyanate functionalities, include, but are not limited to, conventional aliphatic, cycloaliphatic, araliphatic and aromatic isocyanates other than PMDI. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate, 1,6-hexamethylene diisocyanate; cycloaliphatic diisocyanates such as 1,3- and 1,4-cyclohexane diisocyanate as well as any combinations of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric combinations, 4,4'-2,2'-, and 2,4'-dicyclohexylmethane diisocyanate as well as the corresponding isomeric combinations and aromatic diisocyanates and polyisocyanates such as 2,4- and 2,6-toluene diisocyanate and the corresponding isomeric combinations 4,4'-, 2,4'-, and 2,2'-diphenylmethane diisocyanate and the corresponding isomeric combinations, combinations of 4,4'-, 2,4'-, and 2,2-diphenylmethane diisocyanates and polyphenylenepolymethylene polyisocyanates (crude MDI), as well as combinations of crude MDI and toluene diisocyanates. The organic di- and polyisocyanates can be used individually or in the form of combinations.

Additionally, so-called modified multivalent isocyanates, i.e., products obtained by the partial chemical reaction of organic diisocyanates and/or polyisocyanates may be used. Examples include diisocyanates and/or polyisocyanates containing ester groups, urea groups, biuret groups, allophanate groups, carbodiimide groups, isocyanurate groups, and/or urethane groups. More specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as combinations include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described above; 4,4'-diphenylmethane diisocyanate, combinations of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

To produce the polyurethane backing layer of the subject invention, the polyol resin and the polyisocyanate are reacted in such amounts that a stoichiometric isocyanate index, defined as the number of equivalents of NCO groups divided by the total number of isocyanate reactive hydrogen atom equivalents multiplied by 100, ranges from about 100 to less than about 150, preferably from about 100 to 130, most preferably from about 100 to 115.

The reaction product of the polyol resin and the polyisocyanate, i.e., the polyurethane backing layer, are applied, preferably by spray application, to the UV-cured layer after the UV-curable composition has been applied to the acrylic show surface and is cured thereby forming the UV-cured layer, which is described below. During application of the polyurethane backing layer, the volume ratio of the polyol resin to the polyisocyanate is from 3:1 to 1:3. More preferably, the volume ratio is 1.5:1. With this preferred embodiment for the polyol resin and the polyisocyanate, the volume ratio of 1.5:1 ensures that a stoichiometric excess of polyisocyanate is present as the polyurethane-based coating is applied to form the polyurethane backing layer.

The thickness of the polyurethane backing layer in the completed composite article can vary from 1 to 2000 mils. Most preferably, the thickness is from 100 to 400 mils. Furthermore, to balance required physical properties including, but not limited to, rigidity, impact strength, flexural modulus, and overall durability and support of the acrylic layer, i.e., the acrylic show surface, the polyurethane backing layer is designed to further include chopped fibers as is known in the art to enhance structural integrity. These chopped fibers include, but are not limited to, chopped fiberglass, chopped carbon fibers, chopped wood fibers, chopped aramid fibers including all aromatic polyamide materials, chopped polymer fibers such as nylon, and combinations thereof.

Preferably, the chopped fiber is chopped fiberglass that is present in the polyurethane backing layer in an amount from 1 to 50, more preferably from 15 to 35, parts by weight based on 100 parts by weight of the polyurethane backing layer. Certain embodiments of the subject invention may include a plurality, i.e., more than one polyurethane backing layer. In these embodiments, the chopped fibers can be flattened by rolling prior to application of a subsequent polyurethane backing layer.

As initially described above, the UV-curable composition, which, as described below, is formed by the combination of at least one monomer and a curing initiator, is applied between the acrylic layer and the polyurethane backing layer to enhance bonding between these layers. As such, the UV-curable composition may be referred to as a UV-curable primer composition. The UV-curable composition is preferably formed prior to the application between the acrylic layer and the polyurethane backing layer.

However, it is to be understood that the UV-curable composition may be formed simultaneous with the application. That is, the at least one monomer and the curing initiator may be combined to form the UV-curable composition during application. A preferred way to apply the UV-curable composition is to spray apply the UV-curable composition onto the acrylic layer or the acrylic-based substrate. Of course, it is to be understood that other application methods including, but not limited to, wiping, rolling, and brushing, may be utilized to apply the UV-curable composition.

The UV-curable composition includes the at least one monomer. The at least one monomer includes an ethylenically unsaturated methacrylate monomer, an ethylenically unsaturated acrylate monomer, or combinations thereof. Because the at least one monomer is methacrylate or acrylate-based, it is compatible with the acrylic layer. It is believed that there is an affinity between the methacrylate and acrylate-based monomers and the acrylic layer such that, during a dwell time, the monomers of the UV-curable composition can penetrate the interstitial spaces present in the acrylic layer. More specifically, after the UV-curable composition is applied to the acrylic layer, the UV-curable composition is allowed to dwell on the acrylic layer for at least 5, preferably for at least 20 minutes, such that the monomer or monomers in the UV-curable composition can compatibilize with the acrylic layer. That is, the UV-curable composition is permitted to dwell on the acrylic layer for a period of time before the UV-curable composition is exposed to the UV electromagnetic radiation to cure. Exposure of the UV-curable composition to UV electromagnetic radiation is described below. It is to be understood that the period of time that the UV-curable composition dwells varies depending on the temperature throughout the dwell time. Generally, the higher the temperature, the shorter the dwell time, and vice versa. The temperature throughout the dwell time preferably ranges from 67° F. to 120° F.

The at least one monomer has a hydroxy functional group that is reactive with the polyisocyanate from the polyurethane backing layer. Specifically, the hydroxy functional group of the at least one monomer is reactive with the stoichiometric excess of polyisocyanate that is present in the polyurethane backing layer. The UV-curable composition may be referred to as a hydroxy-terminated, UV-curable primer composition. Once the polyurethane backing layer is applied to the UV-cured layer, the hydroxy functional group of the monomer or monomers reacts with isocyanate moieties present in the stoichiometric excess of polyisocyanate to establish urethane linkages between the UV-cured layer, formed from the UV-curable composition, and the polyurethane backing layer thereby enhancing the bonding between the acrylic layer, which the UV-curable composition has compatibilized with, and the polyurethane backing layer.

Overall, the bond between the acrylic layer, i.e., the acrylic show surface, and the polyurethane backing layer is a cohesive bond. Under testing known in the art, cohesive bonds exhibit cohesive failure, which is a desired physical property. That is, upon attempts to manually pry apart the discrete layers of the composite article, the acrylic layer and the polyurethane backing layer stick to each other thereby demonstrating that any bond between the acrylic layer and the polyurethane backing layer, through the UV-cured layer, is stronger than the discrete layers themselves. Another particular manner in which the bond between the acrylic layer and the polyurethane backing layer may be evaluated is by measurement with an Instron Tester. With the Instron Tester, a tapered blade is utilized to pry apart the bond between the acrylic layer and the polyurethane backing layer. Then, the force, or load, at failure of the bond is measured in lbs. Preferably, the overall bond strength between the acrylic layer and the polyurethane backing layer, through the UV-cured layer of the subject invention, is resistant to a force of at least 55, more preferably of at least 60, lbs.

The at least one monomer is preferably selected from at least one of a hydroxyaliphatic acrylate and a hydroxyaliphatic methacrylate, and has up to 20 carbon atoms in the alkyl radical. More specifically, the at least one monomer in the UV-curable composition is selected from at least one of hydroxymethyl methacrylate, hydroxyethyl methacrylate, hydroxypropyl methacrylate, hydroxybutyl methacrylate, hydroxymethyl acrylate, hydroxyethyl acrylate, hydroxypropyl acrylate, hydroxybutyl acrylate, and combinations thereof.

Overall, the UV-curable composition includes from 1 to 99 parts by weight of the at least one monomer based on 100 parts by weight of the UV-curable composition. However, depending on the particular embodiment utilized, the amount of the at least one monomer in the UV-curable composition may vary. In a first embodiment, the UV-curable composition includes from 1 to 40, preferably from 5 to 25, parts by weight of the at least one monomer based on 100 parts by weight of the UV-curable composition. In a second embodiment, the UV-curable composition includes from 60 to 99, preferably from 75 to 95, parts by weight of the at least one monomer based on 100 parts by weight of the UV-curable composition. The first and second embodiments, as set forth above, will be described further below.

Although there may be more than one ethylenically unsaturated monomer in the UV-curable composition, a preferred UV-curable composition includes only one ethylenically unsaturated monomer, specifically hydroxyethyl methacrylate.

Other suitable monomers include, but are not limited to, hydroxypropyl methacrylate, butanediol monoacrylate, and glycerin dimethacrylate.

The UV-curable composition also includes a curing initiator. Upon exposure of the UV-curable composition to UV electromagnetic radiation, the curing initiator reacts with the monomer or monomers in the UV-curable composition to cure the UV-curable composition to the acrylic layer thereby forming the UV-cured layer on the acrylic layer. As described below and as understood by those skilled in the art, the UV electromagnetic radiation has a wavelength ranging from 10 to 400, preferably from 300 to 400, nanometers (nm). It is to be understood that in addition to the wavelength range described above, appropriate cure of the UV-curable composition to the acrylic layer also depends on other factors including, but not limited to, the thickness of the UV-curable composition, the temperature, the time and intensity of exposure, and other like factors.

Preferably, the UV-curable composition includes from 0.05 to 4.0, more preferably from 0.1 to 2.5, parts by weight of the curing initiator based on 100 parts by weight of the UV-curable composition.

In view of the reactivity of the curing initiator when exposed to UV electromagnetic radiation, the curing initiator is further defined as a photo initiator that is reactive with the monomer or monomers in the UV-curable composition upon exposure to UV electromagnetic radiation. More specifically, the photo initiator is reactive with the monomer or monomers upon exposure to the UV electromagnetic radiation having the wavelength ranging from 10 to 400, preferably from 300 to 400, nm. The UV-curable composition includes from 0.05 to 4.0, preferably from 0.1 to 2.5, parts by weight of the photo initiator based on 100 parts by weight of the UV-curable composition. Generally, the photo initiator includes an acylphosphine oxide. More specifically, a preferred photo initiator includes 2,4,6-trimethylbenzoylethoxyphenylphosphine oxide. 2,4,6-trimethylbenzoylethoxyphenylphosphine oxide is commercially available as Lucirin® TPO-L from BASF Corporation. Other suitable photo initiators include, but are not limited to, benzoin ethers, 2,2-dialkyl-2-hydroxyacetophenones, IRGACURE® 500, IRGACURE® 819, IRGACURE® 1700, IRGACURE® 1800, IRGACURE® 1850, and combinations thereof. The IRGACURE® photo initiators are commercially available from Ciba Specialty Chemicals.

The UV-curable composition may further include a rheology additive. The rheology additive modifies flow of the UV-curable composition during cure. Accordingly, the rheology additive is selected from at least one of a reduction agent and a thixotropic agent. Overall, the UV-curable composition includes from 1 to 98 parts by weight of the rheology additive based on 100 parts by weight of the UV-curable composition. However, as with the at least one monomer, the amount of the rheology additive present in the UV-curable composition varies depending on the particular embodiment.

In the first embodiment, the rheology additive is further defined as a reduction agent. The reduction agent modifies the flow of the UV-curable composition during cure by reducing a viscosity of the UV-curable composition for appropriate application of the UV-curable composition to the acrylic layer. More specifically, if the UV-curable composition has a lower viscosity, it is atomized better during spray application such that the UV-curable composition 'holds-up' better on vertical surfaces of the composite article and is, therefore, resistant to miscellaneous defects such as sags, drips, and the like. If the reduction agent is present, then the UV-curable composition preferably includes from 60 to 98, more preferably from 70 to 90, parts by weight of the reduction agent based on 100 parts by weight of the UV-curable composition. Recall that, in this first embodiment, with so much reduction agent, e.g. from 60 to 98 parts by weight, there may be only from 1 to 40 parts by weight of the at least one monomer, all based on 100 parts by weight of the UV-curable composition.

The monomer or monomers included in the UV-curable composition, such as hydroxyethyl methacrylate, are preferably in solution with the reduction agent. Preferably, the reduction agent is a solvent, most preferably isopropyl alcohol, in an amount from 60 to 98, most preferably from 70 to 90, parts by weight of the solvent based on 100 parts by weight of the UV-curable composition. Other solvents that may be used for the reduction agent include, but are not limited to, acetone, methanol, and butylacetate. However, so long as the particular monomer or monomers selected are soluble in water, then the reduction agent may be water-based. If the reduction agent is not present, or if the reduction agent is water-based, then the UV-curable composition may be formulated to be free of volatile organic compounds (VOCs).

In the second embodiment, the rheology additive is further defined as a thixotropic agent. Because the thixotropic agent is a thixotrope, it inherently modifies the flow of the UV-curable composition during cure thereby providing for appropriate application of the UV-curable composition to the acrylic layer. With the thixotropic agent, the UV-curable composition can be uniformly applied to the composite article and the reduction agent of the first embodiment is generally not required. With the thixotropic agent, the UV-curable composition 'holds-up' better on vertical surfaces of the composite article and is, therefore, resistant to miscellaneous defects such as sags, drips, and the like. If the thixotropic agent is present, then the UV-curable composition preferably includes from 1 to 15, more preferably from 4 to 9, parts by weight of the thixotropic agent based on 100 parts by weight of the UV-curable composition. Recall that, in this second embodiment, with so little thixotropic agent, e.g. from 1 to 15 parts by weight, there may be as much as from 60 to 99 parts by weight of the at least one monomer, all based on 100 parts by weight of the UV-curable composition. A preferred thixotropic agent is further defined as fumed silica, most preferably Aerosil® R 972 which is commercially available the Degussa Corporation.

The UV-curable composition may further include an indicating agent. The indicating agent indicates if the monomer or monomers have compatibilized with the acrylic layer. If the indicating agent is present in the UV-curable composition, then the UV-curable composition preferably includes from 0.05 to 1.0, more preferably from 0.1 to 0.3, parts by weight of the indicating agent based on 100 parts by weight of the UV-curable composition. Generally, the indicating agent includes a thiophene-based reactive colorant for indicating that the monomer or monomers have compatibilized with the acrylic layer. The thiophene-based reactive colorant operates in that an original color of the reactive colorant is maintained upon exposure to UV electromagnetic radiation if the monomer or monomers have compatibilized with the acrylic layer. On the other hand, if the monomer or monomers have not compatibilized with the acrylic layer, then the original color of the reactive colorant is converted to colorless upon exposure to UV electromagnetic radiation.

In a preferred embodiment, the original color of the reactive colorant is blue. Therefore, if the monomer or monomers of the UV-curable composition have compatibilized with the acrylic layer, then the original blue color of the reactive colorant is maintained, and if the monomer or monomers of the UV-curable composition have not compatibilized with the acrylic layer, then the original blue color of the reactive colorant will convert to colorless. A suitable indicating agent is commercially available as Reactint® Blue 17AB from Milliken Chemical, Division of Milliken & Co., Spartanburg, S.C. This indicating agent, and others like it, are set forth in U.S. Pat. No. 4,775,748, the disclosure of which is incorporated herein by reference in its entirety.

The following examples illustrating the formation of the composite article and the UV-curable composition according to the subject invention, as presented herein, are intended to illustrate and not limit the invention.

EXAMPLES

The composite article and the UV-curable composition are prepared by adding and reacting the following parts, by weight, unless otherwise indicated.

Example 1

TABLE 1A

| | Example 1 Composite Article | | |
|---|---|---|---|
| I | Acrylic Layer | Acrylic-Based Substrate | |
| II | UV-Cured Layer (formed from the UV-curable composition) | UV-Curable Composition Component | Amount (grams) |
| | Monomer | Hydroxyethyl Methacrylate [HEMA] | 10.00 |
| | Curing Initiator | 2,4,6-Trimethylbenzoylethoxyphenylphosphine Oxide [TPO-L] | 0.40 |
| | Reduction Agent | Isopropyl Alcohol [IPA] | 89.45 |
| | Indicating Agent | Reactint ® Blue 17AB [17AB] | 0.15 |
| | | Total | 100.00 |
| III | Polyurethane Backing Layer | Polyurethane-Based Coating [See Table 1B Below] | |

The polyurethane-based coating is prepared by adding and reacting the following parts.

TABLE 1B

| POLYURETHANE BACKING LAYER | |
|---|---|
| | Amount (grams) |
| Polyol Resin | |
| POLYOL A [a trimethylolpropane initiated polyether polyol having a hydroxyl number of about 35, and an average functionality of about 2.5] | 45.58 |
| POLYOL B [a vicinal toluenediamine-initiated polyether polyol having a hydroxyl number of about 390, and an average functionality of about 4.0] | 19.50 |
| SUPPLEMENTAL CHAIN EXTENDER [Diethylene Glycol] | 15.50 |

TABLE 1B-continued

| POLYURETHANE BACKING LAYER | |
|---|---|
| | Amount (grams) |
| FLAME RETARDANT/ SUPPLEMENTAL CROSS-LINKING AGENT [PHT4 Diol] | 5.00 |
| FLAME RETARDANT [Fyrol PCF] | 5.00 |
| PIGMENT [White Pigment] | 3.00 |
| H2O SCAVENGER [Type 3A Molecular Sieve] | 3.00 |
| OTHER ADDITIVES | 3.42 |
| Polyol Resin Total | 100.00 |
| Polyisocyanate | |
| ISOCYANATE [a polymeric diphenylmethane diisocyanate (PMDI)] | 73.95 |
| Polyisocyanate Total | 73.95 |
| Total Polyol Resin and Polyisocyanate | 173.95 |

The acrylic-based substrate is vacuum formed and then mounted onto a conventional form for support. The UV-curable composition is then sprayed onto the acrylic-based substrate and allowed to dwell or soak on the acrylic-based substrate for 20 minutes at approximately 80° F. After 20 minutes, the UV-curable composition is exposed to UV electromagnetic radiation having a wavelength of approximately 380 nanometers to cure the UV-curable composition to the acrylic-based substrate thereby forming the UV-cured layer. The original color of the indicating agent (blue) is maintained, indicating compatibilization of the HEMA monomer in the UV-curable composition with the acrylic-based substrate. After cure, the polyurethane backing layer is spray applied onto the cured composition and then allowed to cure. After the polyurethane backing layer cures, the completed composite article is de-molded from the conventional form. The overall bond strength between the acrylic-based substrate and the polyurethane backing layer shows cohesive failure, a positive result, where the acrylic layer and the polyurethane backing layer stick to each other. Additionally, the overall bond strength is measured to be resistant to a force of 70 lbs. with the Instron Tester as described above.

Example 2

TABLE 2

| | Example 2 Composite Article | | |
|---|---|---|---|
| I | Acrylic Layer | Acrylic-Based Substrate | |
| II | UV-Cured Layer (formed from the UV-curable composition) | UV-Curable Composition Component | Amount (grams) |
| | Monomer | Hydroxyethyl Methacrylate [HEMA] | 20.00 |
| | Curing Initiator | 2,4,6-Trimethylbenzoylethoxyphenylphosphine Oxide [TPO-L] | 0.10 |
| | Reduction Agent | Isopropyl Alcohol [IPA] | 79.75 |
| | Indicating Agent | Reactint ® Blue 17AB [17AB] | 0.15 |
| | | Total | 100.00 |

TABLE 2-continued

| | Example 2 Composite Article | |
|---|---|---|
| III | Polyurethane Backing Layer | Polyurethane-Based Coating [See Table 1B Above] |

The completed composite article of Example 2 is prepared as described above with respect to Example 1 except for a different UV-curable composition. The overall bond strength between the acrylic-based substrate and the polyurethane backing layer shows cohesive failure, a positive result, where the acrylic layer and the polyurethane backing layer stick to each other. Additionally, the overall bond strength is measured to be resistant to a force of 70 lbs. with the Instron Tester as described above.

Example 3

| | Example 3 Composite Article | | |
|---|---|---|---|
| I | Acrylic Layer | Acrylic-Based Substrate | |
| II | UV-Cured Layer (formed from the UV-curable composition) | UV-Curable Composition Component | Amount (grams) |
| | Monomer | Hydroxyethyl Methacrylate [HEMA] | 91.40 |
| | Curing Initiator | 2,4,6-Trimethylbenzoylethoxy-phenylphosphine Oxide [TPO-L] | 1.87 |
| | Thixotropic Agent | Fumed Silica [Aerosil ®R 972] | 6.58 |
| | Indicating Agent | Reactint ® Blue 17AB [17AB] | 0.15 |
| | | Total | 100.00 |
| III | Polyurethane Backing Layer | Polyurethane-Based Coating [See Table 1B Above] | |

The completed composite article of Example 3 is prepared as described above with respect to Example 1 except for a different UV-curable composition having the thixotropic agent as the rheology additive (instead of the reduction agent). The overall bond strength between the acrylic-based substrate and the polyurethane backing layer shows cohesive failure, a positive result, where the acrylic layer and the polyurethane backing layer stick to each other. Additionally, the overall bond strength is measured to be resistant to a force of 70 lbs. with the Instron Tester as described above.

Example 4

| | Example 4 Composite Article | | |
|---|---|---|---|
| I | Acrylic Layer | Acrylic-Based Substrate | |
| II | UV-Cured Layer (formed from the UV-curable composition) | UV-Curable Composition Component | Amount (grams) |
| | Monomer | Hydroxyethyl Methacrylate [HEMA] | 92.57 |
| | Curing Initiator | 2,4,6-Trimethylbenzoylethoxy- | 2.00 |

-continued

| | Example 4 Composite Article | | |
|---|---|---|---|
| | | phenylphosphine Oxide [TPO-L] | |
| | Thixotropic Agent | Fumed Silica [Aerosil ®R 972] | 5.28 |
| | Indicating Agent | Reactint ® Blue 17AB [17AB] | 0.15 |
| | | Total | 100.00 |
| III | Polyurethane Backing Layer | Polyurethane-Based Coating [See Table 1B Above] | |

The completed composite article of Example 4 is prepared as described above with respect to Example 1 except for a different UV-curable composition having the thixotropic agent as the rheology additive (instead of the reduction agent). The overall bond strength between the acrylic-based substrate and the polyurethane backing layer shows cohesive failure, a positive result, where the acrylic layer and the polyurethane backing layer stick to each other. Additionally, the overall bond strength is measured to be resistant to a force of 70 lbs. with the Instron Tester as described above.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A composite article comprising:
    a vacuum-formed acrylic layer;
    a polyurethane layer comprising the reaction product of a polyol resin and a stoichiometric excess of polyisocyanate; and
    a UV-cured layer disposed between said acrylic layer and said polyurethane layer, formed from a UV-curable composition exposed to UV electromagnetic radiation, wherein said UV-curable composition comprises:
        at least one monomer comprising an ethylenically unsaturated methacrylate monomer, an ethylenically unsaturated acrylate monomer, or a combination thereof, wherein said at least one monomer is compatible with said acrylic layer and has hydroxy functional groups reactive with said polyisocyanate, and
        a curing initiator reactive with said at least one monomer upon exposure to UV electromagnetic radiation.

2. A composite article as set forth in claim 1 wherein said UV-curable composition comprises from 1 to 99 parts by weight of said at least one monomer based on 100 parts by weight of said UV-curable composition.

3. A composite article as set forth in claim 2 wherein said at least one monomer comprises hydroxyethyl methacrylate or hydroxyethyl acrylate.

4. A composite article as set forth in claim 2 wherein said at least one monomer is selected from at least one of hydroxymethyl methacrylate, hydroxyethyl methacrylate, hydroxypropyl methacrylate, hydroxybutyl methacrylate, hydroxymethyl acrylate, hydroxyethyl acrylate, hydroxypropyl acrylate, and hydroxybutyl acrylate.

5. A composite article as set forth in claim 2 wherein said at least one monomer is selected from at least one of hydroxyaliphatic acrylate and hydroxyaliphatic methacrylate and has up to 20 carbon atoms in the alkyl radical.

6. A composite article as set forth in claim 2 wherein said UV-curable composition comprises from 1 to 40 parts by weight of said at least one monomer based on 100 parts by weight of said UV-curable composition.

7. A composite article as set forth in claim 6 wherein said UV-curable composition comprises from 5 to 25 parts by weight of said at least one monomer based on 100 parts by weight of said UV-curable composition.

8. A composite article as set forth in claim 2 wherein said UV-curable composition comprises from 60 to 99 parts by weight of said at least one monomer based on 100 parts by weight of said UV-curable composition.

9. A composite article as set forth in claim 8 wherein said UV-curable composition comprises from 75 to 95 parts by weight of said at least one monomer based on 100 parts by weight of said UV-curable composition.

10. A composite article as set forth in claim 1 wherein said UV-curable composition comprises from 0.05 to 4.0 parts by weight of said curing initiator based on 100 parts by weight of said UV-curable composition.

11. A composite article as set forth in claim 1 wherein said curing initiator is a photo initiator reactive with said at least one monomer upon exposure to UV electromagnetic radiation, said photo initiator being present in said UV-curable composition in an amount from 0.05 to 4.0 parts by weight based on 100 parts by weight of said UV-curable composition.

12. A composite article as set forth in claim 1 wherein said curing initiator comprises 2,4,6-trimethylbenzoylethoxyphenylphosphine oxide or an acylphosphine oxide.

13. A composite article as set forth in claim 1 wherein said curing initiator is reactive with said at least one monomer upon exposure to UV electromagnetic radiation having a wavelength ranging from 10 to 400 nanometers.

14. A composite article as set forth in claim 1 wherein said curing initiator is reactive with said at least one monomer upon exposure to UV electromagnetic radiation having a wavelength ranging from 300 to 400 nanometers.

15. A composite article as set forth in claim 1 wherein said UV-curable composition further comprises a rheology additive in an amount of from 1 to 98 parts by weight based on 100 parts by weight of said UV-curable composition.

16. A composite article as set forth in claim 15 wherein said rheology additive is selected from at least one of a reduction agent and a thixotropic agent.

17. A composite article as set forth in claim 16 wherein said UV-curable composition comprises from 60 to 98 parts by weight of said reduction agent based on 100 parts by weight of said UV-curable composition.

18. A composite article as set forth in claim 17 wherein said at least one monomer is in solution with said reduction agent.

19. A composite article as set forth in claim 18 wherein said reduction agent is water.

20. A composite article as set forth in claim 18 wherein said reduction agent is a solvent.

21. A composite article as set forth in claim 20 wherein said solvent is isopropyl alcohol.

22. A composite article as set forth in claim 16 wherein said UV-curable composition comprises from 1 to 15 parts by weight of said thixotropic agent based on 100 parts by weight of said UV-curable composition.

23. A composite article as set forth in claim 22 wherein said thixotropic agent is fumed silica.

24. A composite article as set forth in claim 1 wherein said UV-curable composition further comprises an indicating agent in an amount of from 0.05 to 1.0 parts by weight based on 100 parts by weight of said V-curable composition.

25. A composite article as set forth in claim 24 wherein said indicating agent comprises a thiophene-based reactive colorant.

26. A composite article as set forth in claim 1 wherein said acrylic layer is a show surface of a bathtub.

27. A composite article as set forth in claim 1 having a bond strength between said acrylic layer and said polyurethane layer of at least 55 lbs.

28. A composite article comprising:
a vacuum-formed acrylic layer;
a polyurethane layer comprising the reaction product of a polyol resin and a stoichiometric excess of polyisocyanate; and
a UV-cured layer disposed between said acrylic layer and said polyurethane layer, formed from a UV-curable composition exposed to UV electromagnetic radiation, wherein said UV-curable composition comprises:
an ethylenically unsaturated monomer component selected from at least one of hydroxymethyl methacrylate, hydroxyethyl methacrylate, hydroxypropyl methacrylate, hydroxybutyl methacrylate, hydroxymethyl acrylate, hydroxyethyl acrylate, hydroxypropyl acrylate, and hydroxybutyl acrylate, wherein said monomer component is compatible with said acrylic layer and has hydroxy functional groups reactive with said polyisocyanate;
a photo initiator vomprising an acylphosphine reactive with said at least one monomer upon exposure to UV electromagnetic radiation;
a rheology additive; and
an indicating agent comprising a thiophene-based reactive colorant.

29. A composite article as set forth in claim 28 wherein said rheology additive is selected from at least one of a reduction agent and a thixotropic agent.

30. A composite article comprising:
an acrylic layer,
a polyurethane layer comprising the reaction product of a polyol resin and a stoichiometric excess of polyisocyanate; and
a UV-cured layer disposed between said acrylic layer and said polyurethane layer, formed from a UV-curable composition exposed to UV electromagnetic radiation, wherein said UV-curable composition comprises:
at least one monomer comprising an ethylenically unsaturated methacrylate monomer, an ethylenically unsaturated acrylate monomer, or a combination thereof, wherein said at least one monomer is compatible with said acrylic layer and has bydroxy functional groups reactive with said polyisocyanate,
a curing initiator reactive with said at least one monomer upon exposure to UV electromagnetic radiation; and
a rheology additive comprising a reduction agent in an amount from 60 to 98 parts by weight based on 100 parts by weight of said UV-curable composition, wherein said reduction agent is water;
and wherein said at least one monomer is in solution with said reduction agent.

31. A composite article as set forth in claim 30 wherein said at least one monomer is selected from at least one of hydroxyaliphatic acrylate and hydroxyaliphacic methacrylate and has up to 20 carbon atoms in the alkyl radical.

32. A composite article as set forth in claim 30 wherein said curing initiator is a photo initiator reactive with said at least one monomer upon exposure to UV electromagnetic radiation.

33. A composite article as set forth in claim 30 wherein said curing initiator comprises 2,4,6-trimethylbenzoylethoxyphenylphosphine oxide or an acylphosphine oxide.

34. A composite article as set forth in claim 30 wherein said curing initiator is reactive with said at least one monomer upon exposure to UV electromagnetic radiation having a wavelength ranging from 10 to 400 nanometers.

35. A composite article as set forth in claim 30 wherein said rheology additive further comprises a thixotropic agent.

36. A composite article as set forth in claim 35 wherein said thixotropic agent is fumed silica.

37. A composite article as set forth in claim 30 wherein said UV-curable composition further comprises an indicating agent.

38. A composite article as set forth in claim 37 wherein said indicating agent comprises a thiophene-based reactive colorant.

39. A composite article comprising:
   an acrylic layer that is a show surface of a composite article selected from the group of bathtubs, swimming pools, boats, and automobile components;
   a polyurethane layer comprising the reaction product of a polyol resin and a stoichiometric excess of polyisocyanate; and
   a UV-cured layer disposed between said acrylic layer and said polyurethane layer, formed from a UV-curable composition exposed to UV electromagnetic radiation, wherein said UV-curable composition comprises:
      at least one monomer comprising an ethylenically unsaturated methacrylate monomer, an ethylenically unsaturated acrylate monomer, or a combination thereof, wherein said at least one monomer is compatible with said acrylic layer and has hydroxy functional groups reactive with said polyisocyanate, and
      a curing initiator reactive with said at least one monomer upon exposure to UV electromagnetic radiation.

40. A composite article as set forth in claim 39 wherein said at least one monomer is selected from at least one of hydroxyaliphatic acrylate and hydroxyaliphatic methacrylate and has up to 20 carbon atoms in the alkyl radical.

41. A composite article as set forth in claim 39 wherein said curing initiator is a photo initiator reactive with said at least one monomer upon exposure to UV electromagnetic radiation.

42. A composite article as set forth in claim 39 wherein said curing initiator comprises 2,4,6-trimethylbenzoylethoxyphenylphosphine oxide or an acylphosphine oxide.

43. A composite article as set forth in claim 39 wherein said curing initiator is reactive with said at least one monomer upon exposure to UV electromagnetic radiation having a wavelength ranging from 10 to 400 nanometers.

44. A composite article as set forth in claim 39 wherein said UV-curable composition further comprises a rheology.

45. A composite article as set forth in claim 44 wherein said rheology additive is selected from at least one of a reduction agent and a thixotropic agent.

46. A composite article as set forth in claim 39 wherein said UV-curable composition further comprises an indicating agent.

47. A composite article as set forth in claim 46 wherein said indicating agent comprises a thiophene-based reactive colorant.

* * * * *